United States Patent
Maritzen et al.

(10) Patent No.: US 7,069,511 B2
(45) Date of Patent: Jun. 27, 2006

(54) PLATFORM INDEPENDENT ON-LINE PROJECT MANAGEMENT TOOL

(75) Inventors: Lynn Michael Maritzen, Milpitas, CA (US); Rolando D. Dimaandal, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 754 days.

(21) Appl. No.: 08/769,404

(22) Filed: Dec. 19, 1996

(65) Prior Publication Data

US 2003/0107587 A1 Jun. 12, 2003

(51) Int. Cl.
*G06F 3/00* (2006.01)

(52) U.S. Cl. ............... 715/733; 715/804; 715/835; 715/968; 707/10; 709/203; 709/219

(58) Field of Classification Search ............ 345/326, 345/329–332, 346, 357, 336, 978, 968, 971, 345/705, 733, 751, 753, 759, 776, 804, 854; 707/10, 104; 709/201, 203–205, 219
See application file for complete search history.

(56) References Cited

U.S. PATENT DOCUMENTS

| | | | | |
|---|---|---|---|---|
| 5,349,658 A | * | 9/1994 | O'Rourke et al. | 345/357 X |
| 5,363,507 A | * | 11/1994 | Nakayama et al. | 345/331 |
| 5,701,451 A | * | 12/1997 | Rogers et al. | 707/1 |
| 5,708,780 A | * | 1/1998 | Levergood et al. | 395/200.59 |
| 5,721,908 A | * | 2/1998 | Lagarde et al. | 707/10 |
| 5,727,950 A | * | 3/1998 | Cook et al. | 434/350 |
| 5,751,956 A | * | 5/1998 | Kirsch | 395/200.33 |
| 5,778,377 A | * | 7/1998 | Marlin et al. | 707/10 X |
| 5,802,530 A | * | 9/1998 | Van Hoff | 707/513 |
| 5,848,412 A | * | 12/1998 | Rowland et al. | 707/10 |
| 5,862,325 A | * | 1/1999 | Reed et al. | 709/201 |
| 5,870,558 A | * | 2/1999 | Branton, Jr. et al. | 709/203 X |
| 5,884,309 A | * | 3/1999 | Vanechanos, Jr. | 707/10 |
| 5,907,324 A | * | 5/1999 | Larson et al. | 345/330 |
| 5,918,214 A | * | 6/1999 | Perkowski | 709/219 X |
| 5,974,446 A | * | 10/1999 | Sonnenreich et al. | 709/203 |
| 5,978,804 A | * | 11/1999 | Dietzman | 707/10 |
| 6,002,853 A | * | 12/1999 | de Hond | 709/219 |
| 6,014,134 A | * | 1/2000 | Bell et al. | 345/329 |
| 6,094,655 A | * | 7/2000 | Rogers et al. | 707/10 |

\* cited by examiner

*Primary Examiner*—X. L. Bautista
(74) *Attorney, Agent, or Firm*—Blakely Sokoloff Taylor & Zafman, LLP

(57) ABSTRACT

A platform- and browser-independent project tracking tool is described for tracking projects of interest to a large number of organizations connected via a wide area network. This project tracking tool includes a database server for managing project information and data, and a graphical user interface server for interacting with users in the interested organization. The graphical user interfaces are created such that they can be accessed over the wide area network using web browsers.

44 Claims, 17 Drawing Sheets

PLATFORM INDEPENDENT ON-LINE PROJECT MANAGEMENT TOOL

CROSS REFERENCE TO APPENDIX INCLUDING A COMPUTER PROGRAM LISTING

Appendix A, which is an integral part of the present disclosure, is an appendix including listings of computer programs and related data in one embodiment of this invention. These listings of computer programs contain material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates to an automatic project management tool. In particular, the present invention relates to an enterprise-wide browser- and platform-independent project management tool which can be accessed over a wide-area network in a non-procedural manner.

2. Discussion of the Related Art

In a large corporation, a development project typically involves a number of organizations with varied interests. For example, a software development project may involve one or more programming groups performing development tasks, a customer service group interested in monitoring the project's progress, and a marketing group interested in coordinating the project's progress with release and promotional activities. As these groups and their diverse environments may be located over a large geographical area, the costs of coordinating activities and communicating the relevant information among these groups can be very high.

In recent years, many tools have been developed for resource-sharing on a wide area computer network. In particular, the development of the "World Wide Web" on the Internet led to the development of resource-providing tools ("web server") and resource-accessing tools ("web browsers"). Typically, an information provider creates a web server with an address known throughout the network. Each web server oversees one or more resources, such as a hypertext file, that users on the wide area network can access using a web browser. A web browser is often a generic client program for communicating with web servers, using a standard protocol such as the "http"—the HyperText Transfer Protocol.

In the state of the art, a web server is also often a generic server program making its resources available through such mechanisms as "CGI[1] scripts" and "applets." A CGI script, which can be written in any programming language, is a platform-specific component that performs resource-specific applications. For example, a web browser can access a search engine by supplying the web server a list of search parameters and the name of the executable program. In this example, the name of the search program can be embedded in a hypertext file, or "web page". By convention, the executable program is typically stored in a "cgi-bin" directory, and is invoked by the server with an expected list of parameter values.

[1] CGI stands for "Common Gateway Interface".

An applet is an encapsulated program segment which can be executed as a CGI script on the web server, as described above. Alternatively, an applet can also be designed to be transferred from the web server to the web browser to be run in the web browser's environment. One example of a programming language designed for applet applications is the Java programming language, designed and made available by Sun Microsystems, Inc. A Java applet is platform-independent and can be run on the web server or be downloaded from the web server to be run by a Java interpreter residing in the web browser. Thus, using CGI scripts and applets, resources can be shared among participants over a wide area network.

The tools developed for the Internet are now applicable to be used in other wide area computer networks, including those private enterprise-wide computer networks popularly referred to as "intranets". In such an environment, a tool for tracking development projects accessible by members of geographically diverse organizations are particularly valuable.

SUMMARY OF THE INVENTION

The present invention provides an object-oriented, platform-independent data management tool, for an application such as project management, which can be accessed through a web browser capable of receiving applets from a web server. Such a project management tool is useful, for example, for enforcing an enterprise-wide uniform framework for building, acquiring, deploying and supporting software.

In one embodiment, the project management tool includes (i) a database for holding the project data; (ii) a database server, having read and write access to the database, for receiving read and write access requests for the project database over the wide area data network; and (iii) a graphical user interface server providing graphical user interfaces, which interact with users via web browsers. In that embodiment, the project database tracks geographically diverse projects. The graphical user interface server generates the graphical user interfaces using java applets.

The present invention includes also the method of tracking projects over diverse geographical areas connected by a wide area network. The steps in this method includes: (i) providing a project database for including therein data pertinent to the projects; (ii) providing a database server, having read and write access to the database over the wide area data network; and (iii) providing a graphical user interface server to generate graphical user interfaces which interact with users via web browsers.

In one embodiment, the method of the present invention stores, for each project in the project database, a record indicating a scope of the project, and according to this scope, a number of documentation and review requirements to be met. The project database is updated as each of the documentation and review requirements is met. The status of the documentation and review requirements can be reported in text form.

The present invention is better understood upon consideration of the detailed description below and the accompanying drawings.

DETAILED DESCRIPTION OF THE PREFERRED EMBODIMENTS

Figure 1:
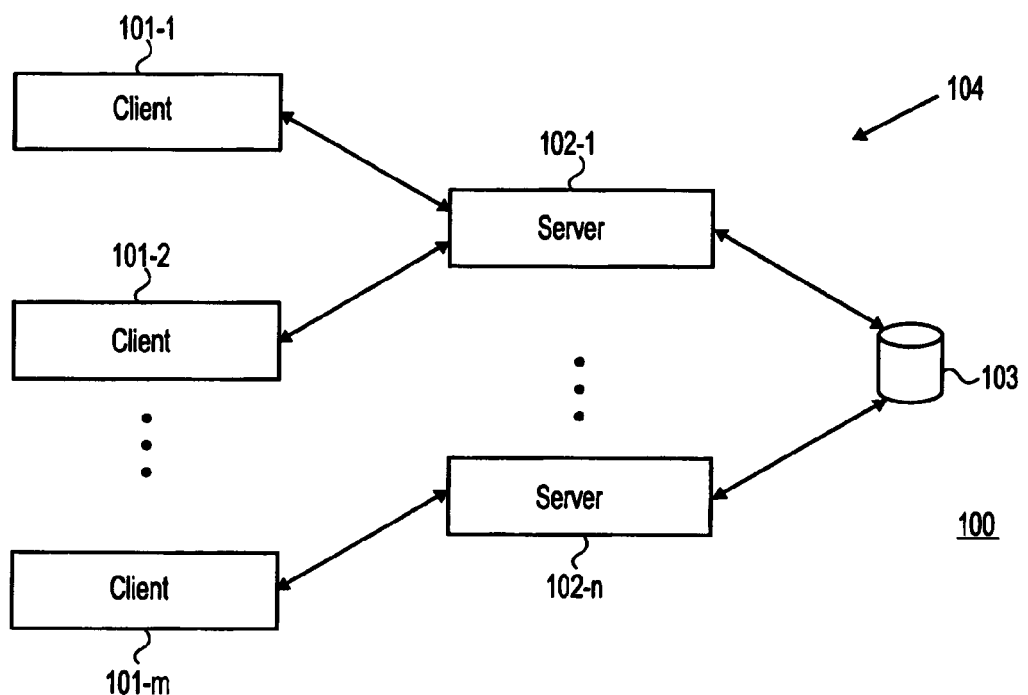
FIG. 1 is a block diagram 100 in an embodiment of the present invention.

The present invention provides a development project tracking tool accessible by a large number of users on a distributed network. One implementation of this development tracking tool is the "SDRA[2] Plus: On-line Tool" ("SPOT") of Sun Microsystems, Inc., Mountain View, Calif., which is the Assignee of the present application. FIG. 1 is a block diagram 100 of an embodiment of the present invention.

As shown in FIG. 1, a database server 103 on a data network 104 provides access to a database of project information (the "SDRA database") tracked by the project management tool of the present invention. In SPOT, access to the SDRA database is provided by an interface to a Sybase database system (the "Sybase Interface"), available from Sybase Corporation. An example of such an interface is one created by Mr. James Todd and can be obtained from Sun Microsystems, Inc. A database server 103, interfaced to the Sybase Interface, accepts queries from a number of SPOT servers 102-1 to 102-n. Queries are typically framed in a database query language, e.g. SQL. Sybase server 103 is described in further detail below. Of course, more than one Sybase server can be used to provide access to the SDRA database. In addition, the SDRA database can be duplicated at multiple nodes on the wide area network, so as to provide additional access efficiency and robustness.

SPOT servers 102-1 to 102-n, which are provided at various sites of data network 104, are accessed by any of the industry standard client "web browsers", such as the Netscape Navigator available from Netscape Corporation. In FIG. 1, web browsers are represented in FIG. 1 by client programs 101-1 to 101-m.

Figure 2:
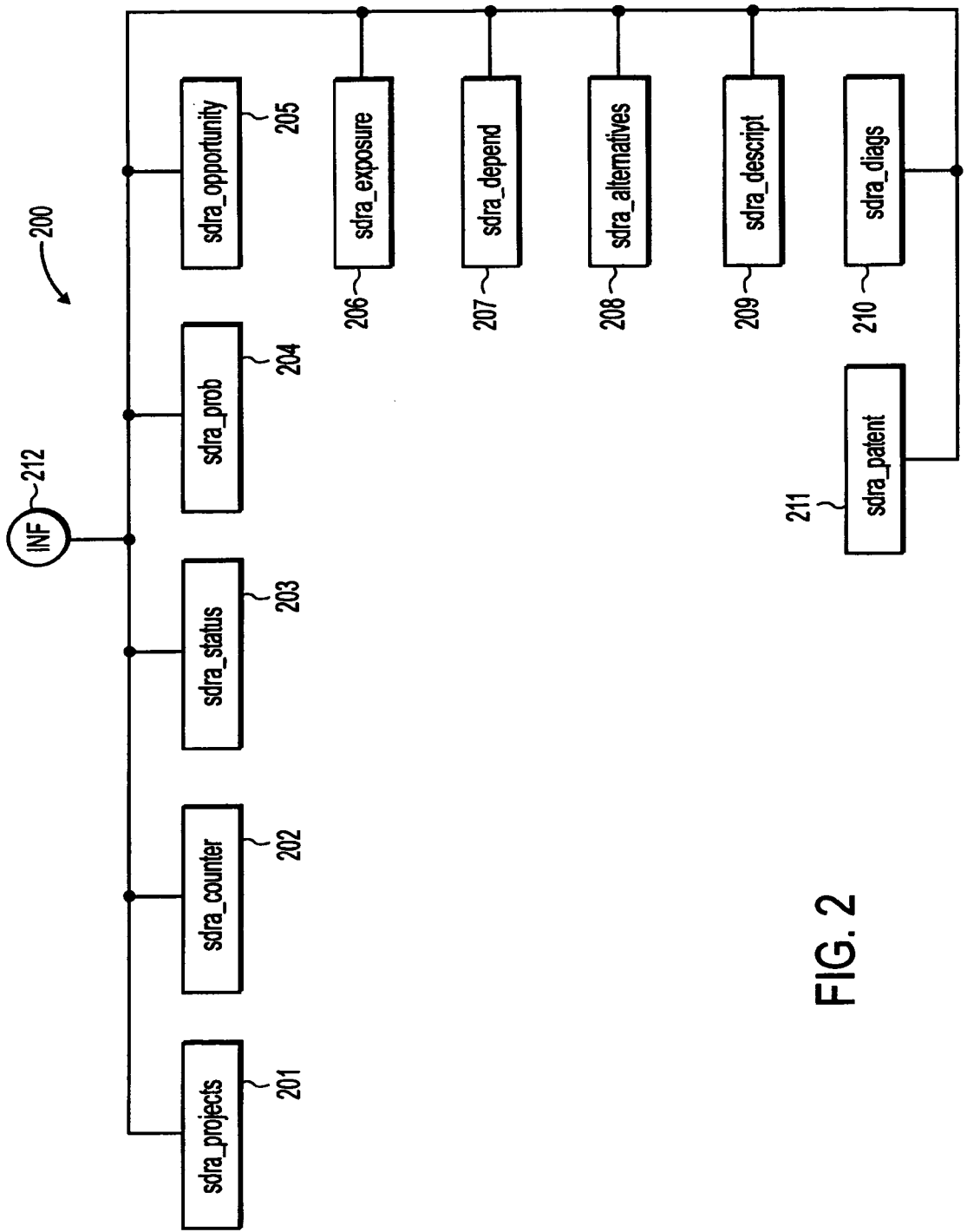
FIG. 2 is a schematic diagram of the records of the SDRA database.

FIG. 2 is a schematic diagram of the SDRA database. As shown in FIG. 2, the SDRA database includes the following records: (i) "sdra_projects" (201), which are the records of the projects tracked by

[2] SDRA stands for Sun's Software Development and Release Architecture. SPOT; (ii) "sdra_counter" (202), which is a non-decreasing counter used to provide a unique project identification code ("pid") for each project; (iii) "sdra_status" (203), which maintains, for each project, a set of status flags for indicating accomplished milestones of the project; (iv) "sdra_prob" (204), "sdra_opportunity" (205), "sdra_exposure" (206), "sdra_depend" (207), "sdra_alternatives" (208), and "sdra_descript" (209), which maintain for each project a problem statement, a business opportunity statement risk exposure statement, a dependency statement, a statement of alternatives for problem solution, and a brief description of the project, respectively; (v) "sdra_diags" (210), which indicates whether diagrams of the project have been included; and (vi) "sdra_patent" (211), which indicates whether patent applications have been filed for the project. In FIG. 2, circle 212 represents the query processor of SDRA database, which interfaces with database server 103.

The "sdra_project" record includes the following fields: (i) "sp_pid", for providing a project identification code; (ii) "sp_name", for providing a project name; (iii) "sp_lead", for providing the project leader's name; (iv) "sp_ba", for providing the name of a business analyst for the project; (v) "sp_sponsor", for providing a project sponsor's name; (vi) "sp_eco", for providing a reference number; (vii) "sp_url", for providing a URL address for the project; (viii) "sp_geo", for indicating a geographical location for the project; (ix) "sp_level", for indicating a size or scope of the project; (x) "sp_zone", for indicating a DNS zone of the project; and (xi) "sp_date" for maintaining a date indicating the last modification date of the record.

The "sdra_counter" record includes a single field "sc_id-counter" which is an integer that is incremented as each new project is created. The "sdra_status" record includes the fields: (i) "ss_pid", which provides the "pid" of the project; (ii) "ss_half_pager", which indicates whether a half-page information sheet for the project has been created; (iii) "ss_one_pager", which indicates whether a one-page information sheet for the project has been created; (iv) "ss_prelim", which indicates whether a preliminary specification has been created for the project; (v) "ss_functional", which indicates whether a functional specification has been created for the project; (vi) "ss_technical", which indicates whether a technical specification has been created for the project; (vii) "ss_project_plan", which indicates whether a project plan has been created; (viii) "ss_arc", which indicates whether an architectural specification has been created for the project; (ix) "ss_acceptance", which indicates whether or not project acceptance has been completed; and (x) "ss_post", which indicates whether or not "post-acceptance" procedures have been completed.

The "sdra_prob", "sdra_opportunity", "sdra_exposure", "sdra_depend", "sdra_alternatives", and "sdra_descript" records each include a "pid" field and a "text" field. The "text" field includes the statement associated with each of the project records. The "sdra_diags" and "sdra_patent" records each include the following fields: (i) a "pid" field for providing a project identification code; (ii) a "flag" for field indicating whether one or more diagrams are available or whether one or more patent applications are filed; and (iii) a "text" field for attaching a text description of the diagrams or patent applications.

Figure 3:
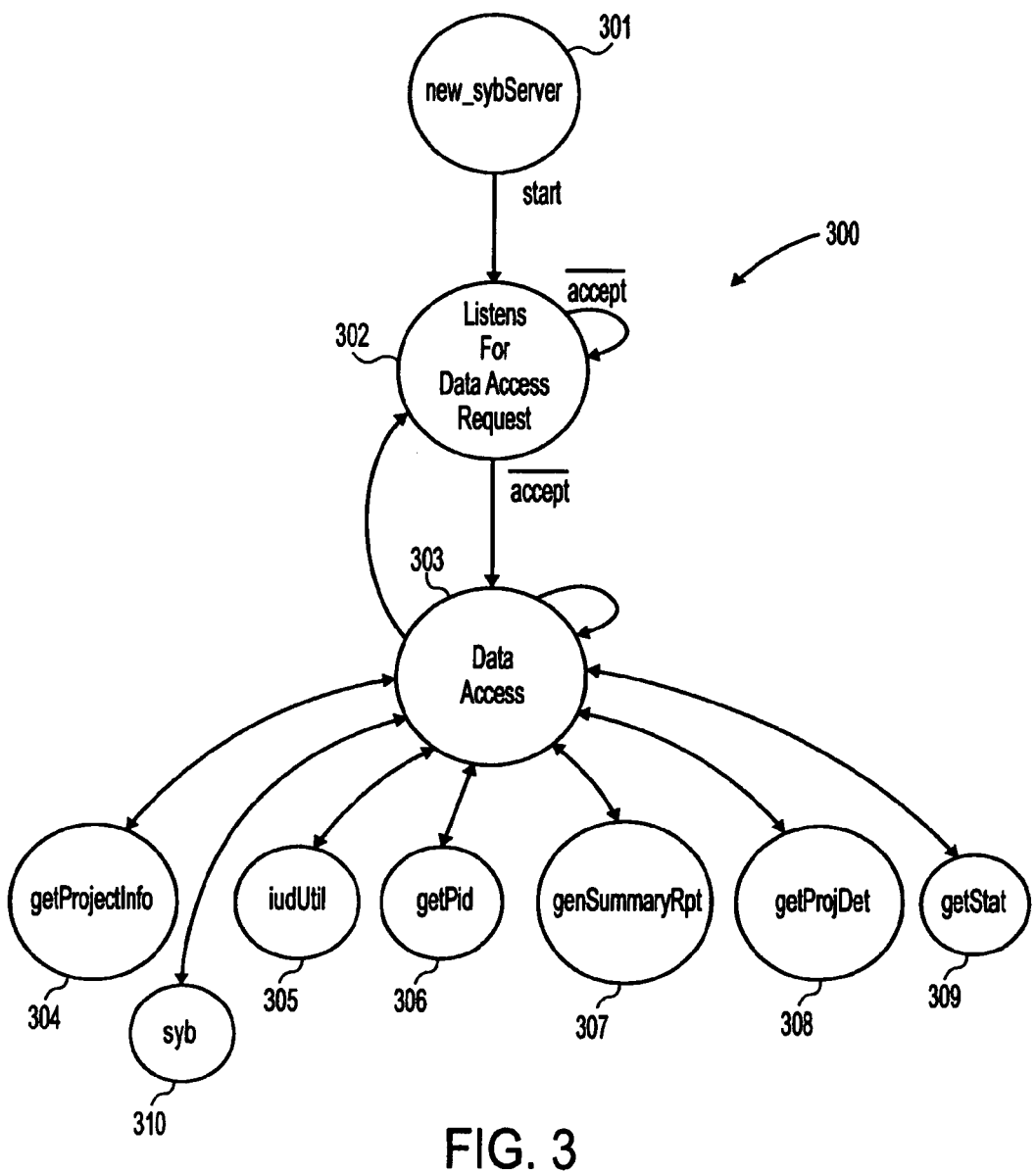
FIG. 3 is a state diagram 300, which illustrates the executable states of new_sybServer.

The Sybase server includes an object of the class new_sybServer, which is an extension of the class Thread of the Java language. FIG. 3 is a state diagram 300, which illustrates the executable states of new_sybServer. The code for new_sybServer is included in section "svr.jav" of Appendix A. As shown in FIG. 3, the new_sybServer object is created as a new thread at state 301. At state 301, a socket for the server is opened with a default socket number 4444.

The new_sybServer object creates via its run method a Connection object, which calls the Sybase Interface. The Connection object then listens for data access requests arriving at the socket. In this instance, database access requests originate from SPOT servers 102-1 to 102-*n*. The constructor of the Connection object creates (i) an input stream and an output stream for communicating with the Sybase Interface; (ii) initializes an interface "syb" (310) to the SDRA database; and (iii) runs the Connection object as a separate thread from the new_sybServer object (state 303). In this embodiment, the Connection object handles six request types: (i) retrieve project name, serviced by method "getProjectInfo" (304), which retrieves project names from sdra_project records; (ii) retrieve project identification information, serviced by method "getPid" (306), which retrieves a list of "pids" of projects tracked by SPOT; (iii) generate a summary report, serviced by method "genSummaryRpt" (307), which retrieves Pids, project names, project leads and dates from the sdra_project records; (iv) retrieve project detailed information, serviced by method "getProjDet" (308), which retrieves project names, project leads, business analysts, project sponsors, urls, eco reference numbers and geographical areas; (v) retrieve status information, serviced by method "getStat" (309), which retrieves project status flags, i.e. the "ss_half_pager", "ss_one_pager", "ss_prelim", "ss_functional", "ss_technical", "ss_proj_plan", "ss_arc", "ss_acceptance", and "ss_post" flags. The Connection object retrieves the relevant information by passing the query to the Sybase Interface, which executes the SQL procedure get_db_info, shown in the listing "info.sql" in Appendix A.

The SPOT server is implemented by a number of java applets including: sdra, sdra_pop_one, sdra_pop_two, sdra_pop_three, sdra_pop_four, sdra_pop_five, sdra_pop_six, sdra_pop_seven, sdra_pop_eight, sdra_rep_win, sdra_dial, sdra_edit and sdra_criter. Applet sdra implements the main graphical user interface ("sdra GUI"). Applets sdra_pop_one, sdra_pop_two, sdra pop_three, sdra_pop_four, sdra_pop_five, sdra_pop_six, sdra_pop_seven, sdra_pop_eight, sdra_dial, sdra_edit and sdra_criter implement, respectively, the "Problem Statement", "Business Opportunity", "Exposure", "Dependencies", "Alternatives", "Description", "Diagrams", "Patents", "SDRA Message", "Edit Existing Project" and "Status Criteria" pages of the graphical user interface (GUI). Applets sdra_rep_win and sdra_rep_stage invokes a report generator for displaying in a window and a report generator for a hard copy device, respectively. Listings of the applets sdra, sdra_pop_one, sdra_pop_two, sdra_pop_three, sdra_pop_four, sdra_pop_five, sdra_pop_six, sdra_pop_seven, sdra_pop_eight, sdra_rep_win, sdra_dial, sdra_edit and sdra_criter are provided in Appendix A as sdra.java, sdra_pop_one.java, sdra_pop_two.java, sdra_pop_three.java, sdra_pop_four.java, sdra_pop_five.java, sdra_pop_six.java, sdra_pop_seven.java, sdra_pop_eight.java, sdra_rep win.java, sdra_dial.java, sdra_edit.java and sdra_criter.java respectively. The applets communicate through a conmonBuf object. Java applet commonBuf, which creates the shared commonBuf object is included in Appendix A as commonBuf.java.

Figure 4:
FIG. 4 is the screen image of the web page generated by CGI script genSplash.sh.

To access the SPOT server, a user points his/her web browser to the SPOT server's published web page. A listing of this web page in HTML format for this implementation is included in Appendix A as splash.html. Web page splash.html invokes a CGI script genSplash.sh which generates another hypertext file to the web browser. The screen image of this hypertext file is shown in FIG. 4. CGI script genSplash.sh accesses the SDRA database to retrieve a list of projects tracked by SPOT, using an SQL program segment included in CGI script genSplash.sh. As shown in FIG. 4, CGI script genSplash.sh lists each project by their project identification code (sp_id), and displays the name (sp_name), leader (sp_leader) and the URL of the project, if a web page exists for that project.

Figure 5:
FIG. 5 is the screen image of the graphical user interface created by java applet sdra.

CGI script genSplash.sh is also included in Appendix A. By clicking in the web page generated by genSplash.sh, the java applet sdra is invoked. Java applet sdra, as in the other applets, is written using a resource tool kit called SpecJava, which provides a GUI as a work space for laying out the user's GUI, and generates the user's GUI from the work space and user-supplied methods. The user-supplied methods are separately written java code placed in an input file for inclusion in the java applet. In SpecTcl, the GUI designer places in the work space "frames", "checkboxes", "labels", "buttons", "radio buttons", "text boxes" and other familiar GUI objects. As these objects are placed, where appropriate, the user associates these objects with action methods for handling events. For example, as shown in the listing sdra.java of java applet sdra in Appendix A, the GUI designer assigns in method handleEvent an action method "getURL" with a radio button 18, which is in the checkbox group "geo", along with other radio buttons 19-22. Radio buttons 18-22 are assigned labels "Global", "US", "EMEA", "ALA", "Japan", respectively. The screen image of the GUI created by applet sdra is shown in FIG. 5. When radio button 18 is selected, a user-supplied method genURL is invoked. User-supplied method genURL (i) retrieves from the checkbox group geo the currently depressed radio button (i.e. radio button 18) within the checkbox group, (ii) returns the label associated with the currently depressed radio button, (iii) retrieves the name of the current project from a text box entry$_1$[3], (iv) creates a new URL address from the retrieved project and the label associated with radio button 18, and (v) writes the newly created URL address into text box entry$_4$, which is the text box next to button 9 (i.e. the button labelled "OPEN").

[3] Text box entry_1 is shown in FIG. 5 as the text box entry next to the label "PROJECT NAME" at the upper left hand corner of the screen image.

When applet sdra is invoked from CGI script sdra.sh, the main method in the sdra object is executed (i) to create a new frame (i.e. a new window), (ii) to create and initialize an sdra object, (iii) to place the sdra object thus created into the new frame, and (iv) to show the frame. In the process of creating and initializing the sdra object, instances of sdra_pop_one, sdra_pop_two, sdra_pop_three, sdra_pop_four, sdra_pop_five, sdra_pop_six, sdra_pop_seven, sdra_pop_eight, sdra_rep_win, sdra_dial, sdra_edit and sdra_criter are created and placed into a commonBuf object ("common buffer"), which is also created and initialized at this time. When the frame is shown, method handleEvent of the sdra object handles user manipulations upon the sdra GUI objects.

As shown in FIG. 5, the user can edit any information in the text boxes of the sdra GUI and updates the project record in the SDRA database. Upon the user selecting the button labelled "submit", method handleEvent calls method submitData, which sends to the Sybase server (i) a command submit_new_data to update project information (i.e., project name, project lead, reference number, business advisor, sponsor, the URL of the project, the level of the project, the sponsor status, the geographical zone location and the operational organization of the project), and (ii) a command "insert" to insert a "half-page" information statement, for each of eight categories (i.e. "Problem Statement", "Opportunity", "Exposure", "Dependencies", "Alternatives", "Description", "Diagrams" and "Patents) half-page statements. If any of the half-page information statement already exists, an additional command "delete" is sent to the Sybase server to delete the existing information statement. Command submit_new_data is a SQL script, which is included in Appendix A as submit_new_data.sql.

Figure 6:
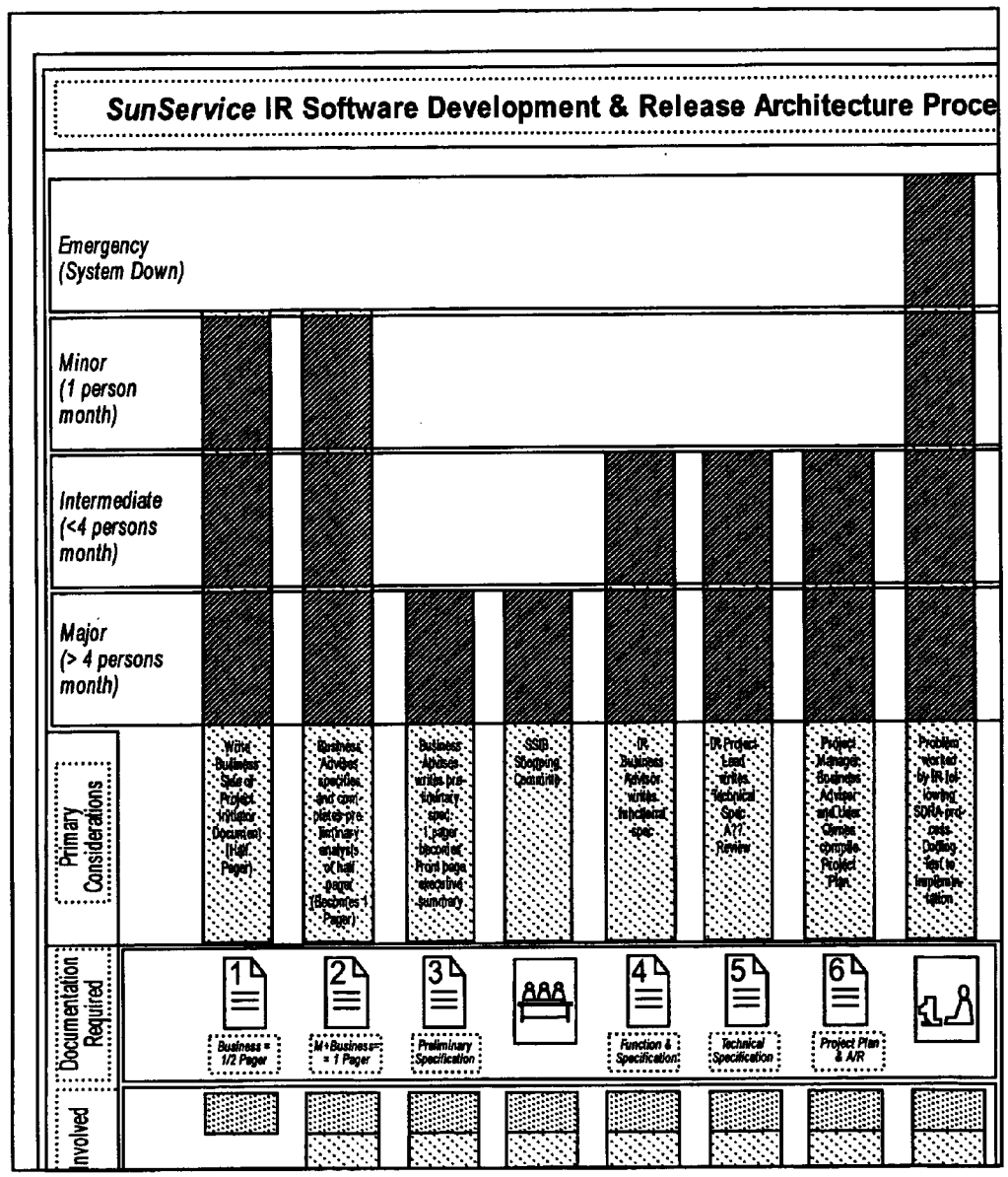
FIG. 6 is a graphical image showing the SDRA process.

The user can also select the button reset, which cause the method resetSdra to clear all text fields in the sdra GUI and the pop-up windows, and resets states of the radio buttons. If the user selects the "More Info" button, the method showInfo is called, which shows a graphical image providing further information about the SDRA process. This graphical image is shown in FIG. 6.

The user can select any of the radio buttons in the "LEVEL OF PROJECT" group, the "GEO" group, and the "HALF/ONE-PAGER INFORMATION" group. If a button in the "LEVEL OF PROJECT" group is selected, the corresponding one of the methods setMinorOpts, setMajorOpts, and setIntOpts is executed, and the appropriate radio buttons in the "STATUS" group are activated depending upon whether the project is a major opportunity, intermediate opportunity, or a minor opportunity. In general, each radio button in the STATUS group represents a documentation or review requirement, which may or may not be required for the project depending on whether the project is a major opportunity, intermediate opportunity, or a minor opportunity.

Figure 7:
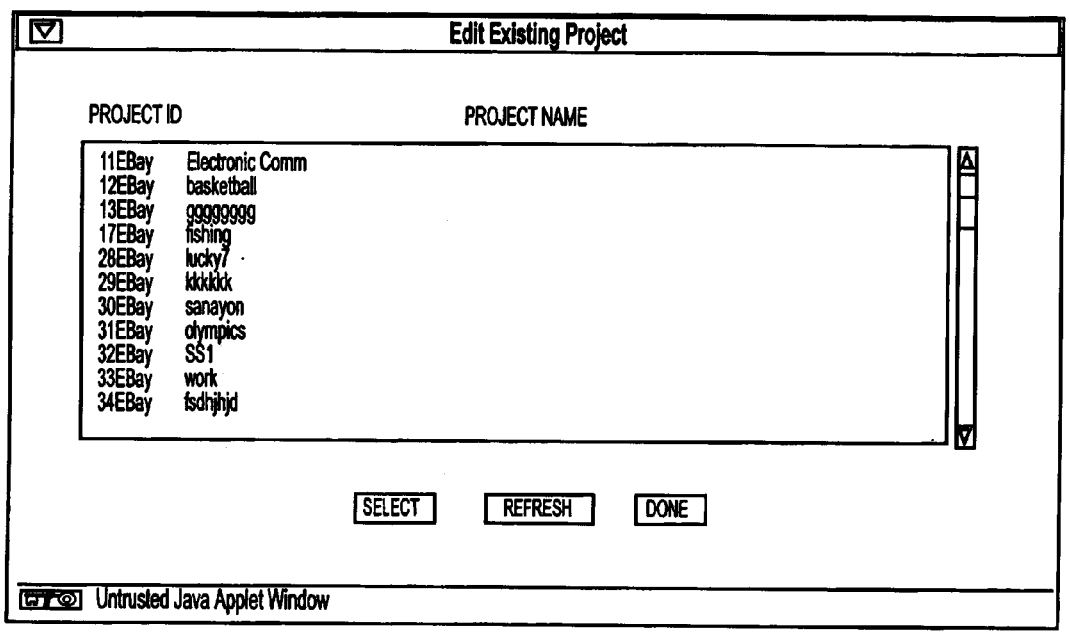
FIG. 7 is a screen image of the pop-up window "Edit Existing Project".

If the user selects the "QUERY" button, the method popEdit is executed, which brings up a pop-up window "Edit Existing Project" to allow an editing existing project. The screen image of this pop-up window is shown in FIG. 7. Pop-up window "Edit Existing Project" is managed by the java applet sdra_edit. The user can choose from the list box in the "Edit Existing Project" window a project he/she wishes to edit. Upon selecting the "SELECT" button, the method showData is executed, which retrieves from the SDRA database, through the Sybase server, the record of the project selected in the list box, using the method getDbInfo. Method getDbInfo executes a SQL script get_db_info, which is included in Appendix A as get_db_info.sql. The retrieved project information is shown in a sdra GUI. In the "Edit Existing Project" window, if the user selects the "REFRESH" button, the method loadEdit is executed, which retrieves from the SDRA database, through the Sybase server, the list of projects in the SDRA database. When the "DONE" button is selected, the user returns to the sdra GUI using the method exitEdit, which disposes of the sdra_edit object.

Figure 8:
FIG. 8 is a screen image of an example detailed report is shown in FIG. 8.
Figure 9:
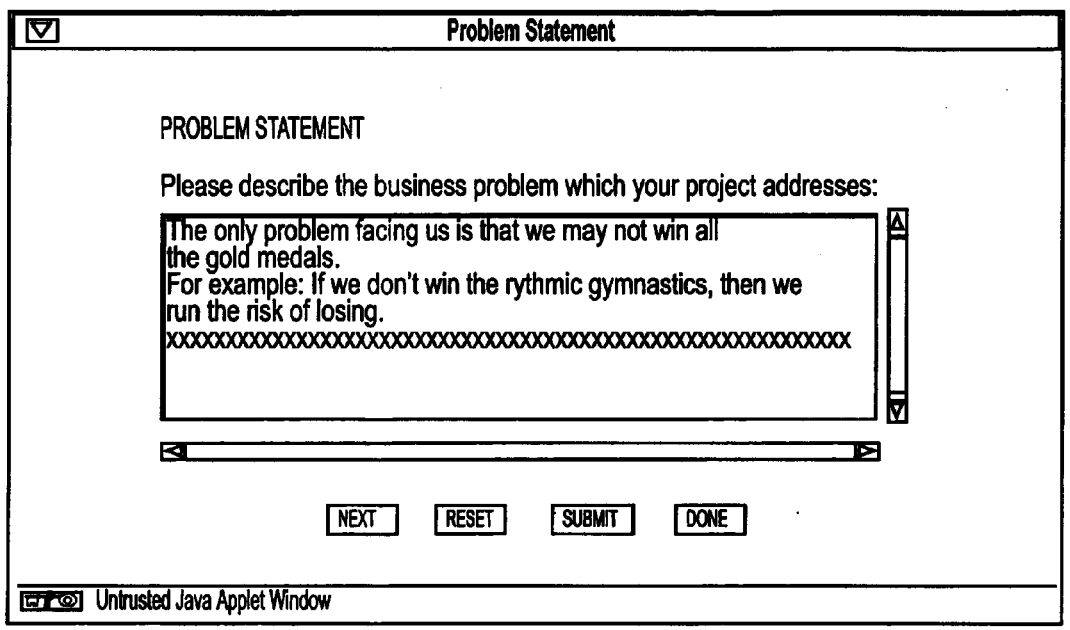
FIG. 9 shows the screen image created by the applet sdra_pop_one.
Figure 10:
FIG. 10 shows the screen image created by the applet sdra_pop_two.
Figure 11:
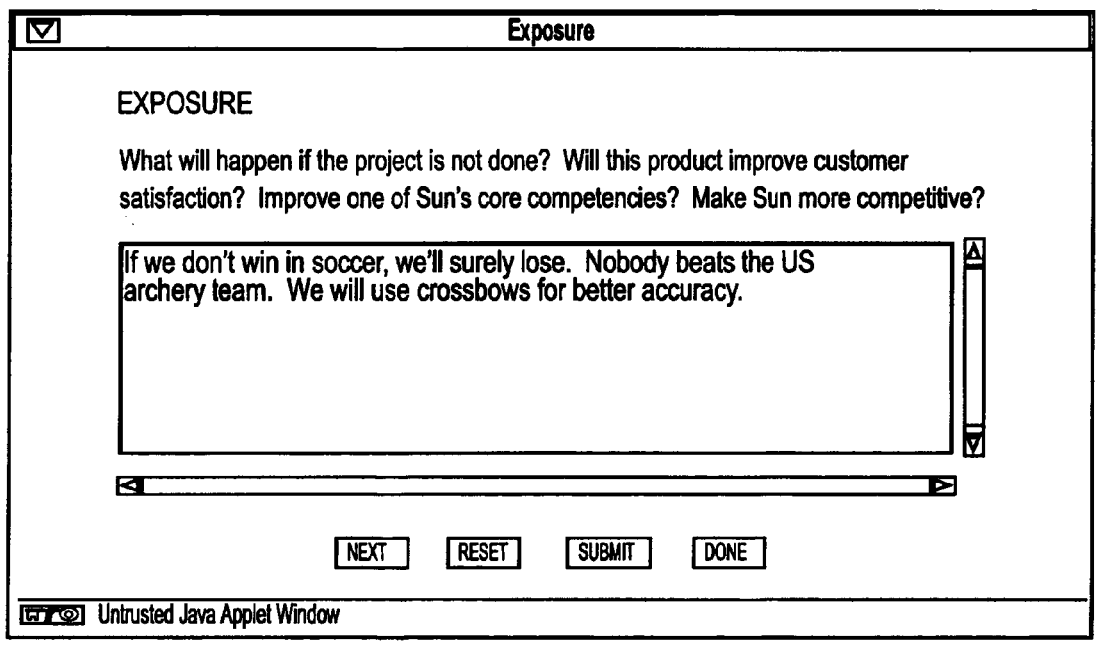
FIG. 11 shows the screen image created by the applet sdra_pop_three.
Figure 12:
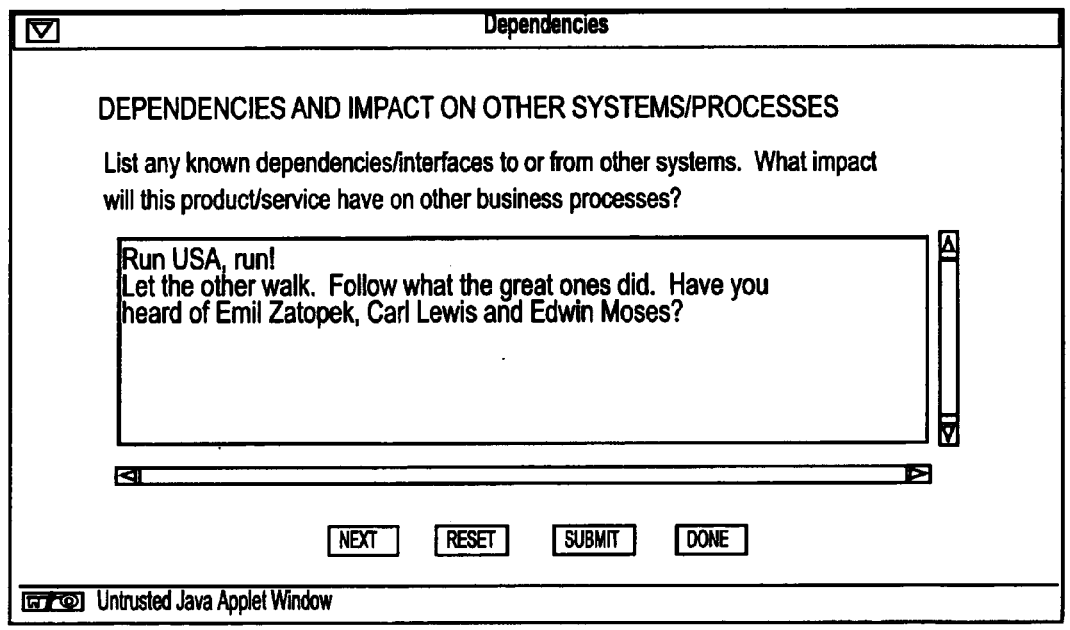
FIG. 12 shows the screen image created by the applet sdra_pop_four.
Figure 13:
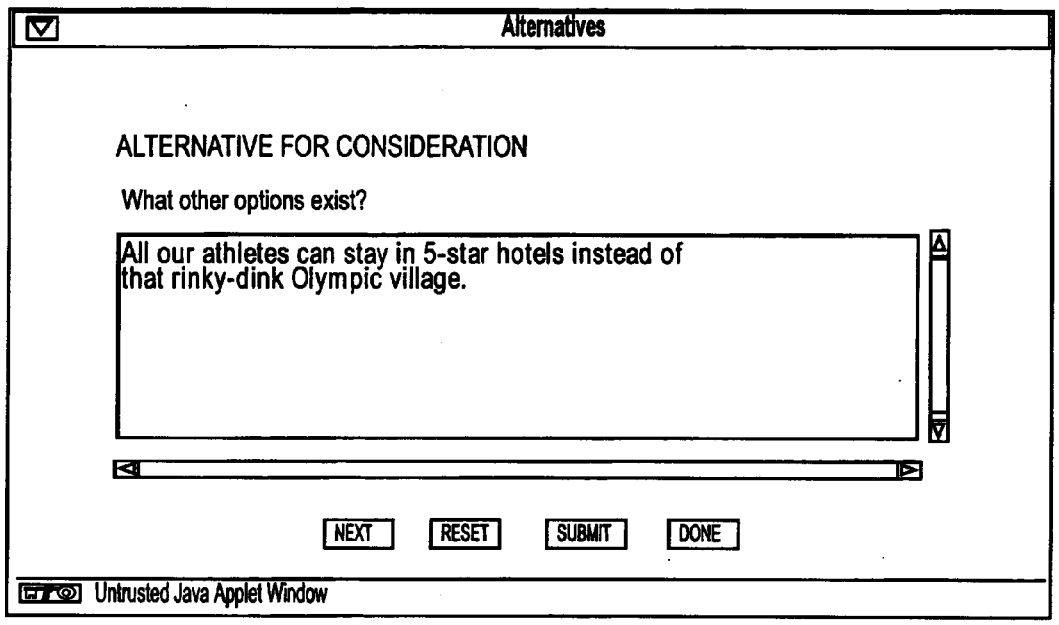
FIG. 13 shows the screen image created by the applet sdra_pop_five.
Figure 14:
FIG. 14 shows the screen image created by the applet sdra_pop_six.
Figure 15:
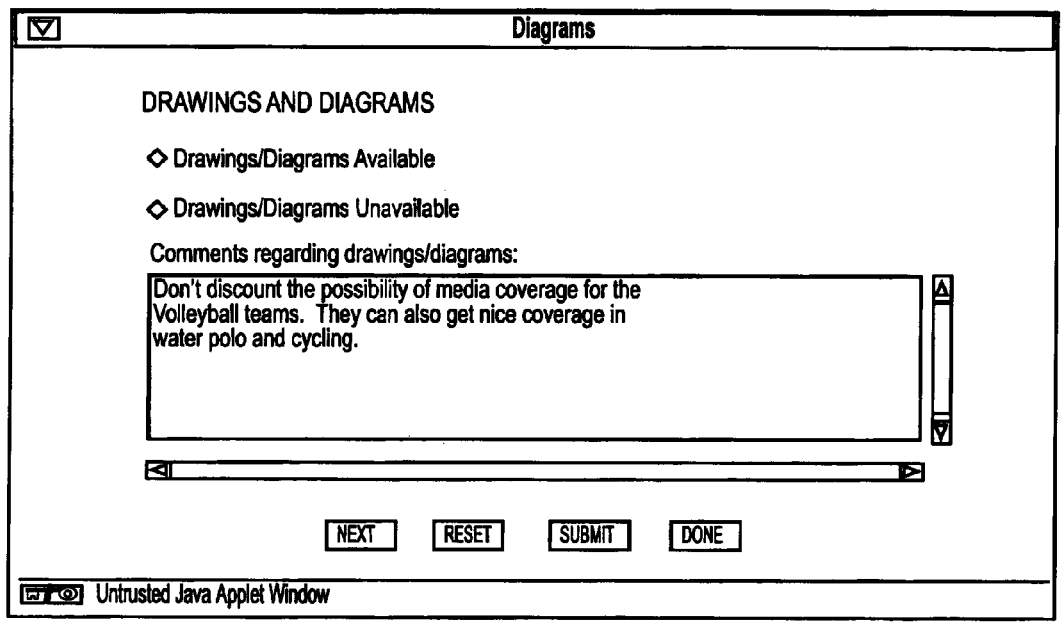
FIG. 15 shows the screen image created by the applet sdra_pop_seven.
Figure 16:
FIG. 16 shows the screen image created by the applet sdra_pop_eight.
Figure 17:
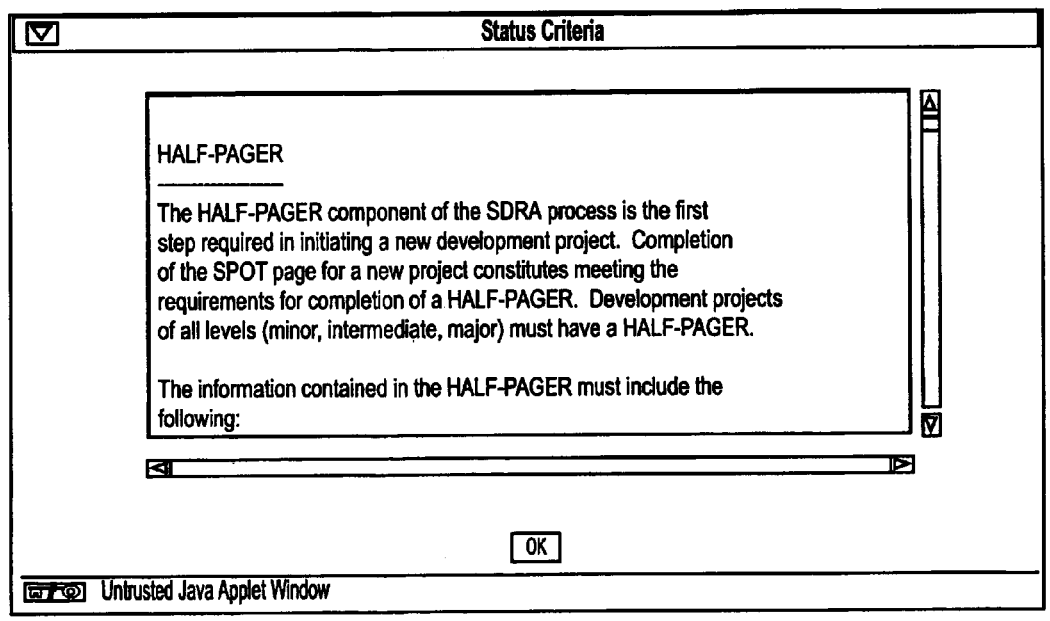
FIG. 17 shows the screen image created by the applet sdra_criter.

In the sdra GUI, if the user selects any of the radio button in the "GEO" group, the geographical zone of the project is reselected, sdra calls the method genUrl which re-generates the URL in the "URL:" text field. If the user selects the "OPEN" button, the method linkToUrl is executed, which sets the web browser to the web page pointed to by the URL: text field. If the user selects the "SUMMARY REPORT" button, the method genReport is called, which executes a CGI script summaryRpt.sh to provide a summary report of the project. If the button "DETAILED REPORT" is selected, the method genDetail is executed, which executes a CGI script genRpt.sh to create a detailed report of the project. This detailed report is provided as a hypertext document. The web browser is then set to the URL of this detailed report for display. A screen image of an example detailed report is shown in FIG. 8.

If the "CRITERIA" button is selected, the method showCrit is executed, which brings up a pop-up window including a text area for displaying textual information about the documentation and review requirements of a project in the SDRA database. When the user finishes reviewing the text, the user returns to the sdra GUI using the "OK" button.

If any of the radio buttons in the "HALF/ONE-PAGER INFORMATION" group is selected, the corresponding one of applets sdra_pop_one, sdra_pop_two, sdra_pop_three, sdra_pop_four, sdra_pop_five, sdra_pop_six, sdra_pop_seven, and sdra_pop_eight is executed. Each applet brings up a pop-up window including the buttons "NEXT", "RESET", "SUBMIT" and "DONE". The screen images of sdra_pop_one, sdra_pop_two, sdra_pop_three, sdra_pop_four, sdra_pop_five, sdra_pop_six, sdra_pop_seven, and sdra_pop_eight are provided in FIGS. 9-16, respectively. Each pop-up window also includes a text area for displaying half/one page text associated with the corresponding one of the categories "Problem Statement", "Opportunity", "Exposure", "Dependencies", "Alternatives", "Description", "Diagrams" and "Patents".

In each of the applets sdra_pop_one, sdra_pop_two, sdra_pop_three, sdra_pop_four, sdra_pop_five, sdra_pop_six, sdra_pop_seven, and sdra_pop_eight, selecting the "NEXT" button executes the next applet. For example, in applet sdra_pop_one, if the user selects the "NEXT" button, the applet sdra_pop_two is executed. If the "RESET" button is selected, the corresponding statement displayed in the text area is cleared. The text area can be edited. If the "SUBMIT" button is selected, the statement in the text window is written by method submitData to the commonBuf buffer. Changes to the SDRA database is made when the user selects the "SUBMIT" button in the sdra GUI. If the user selects the "DONE" button, the user is returned to the sdra GUI.

The above detailed description are provided to illustrate the specific embodiments of the present invention and is not intended to be limiting. Numerous modifications and variations within the scope of the present invention are possible. The present invention is defined by the appended claims.

We claim:

1. A system for sharing data over a wide area data network, comprising:
    a database for including therein said shared data;
    a database server, having read and write access to said database, for receiving read and write access requests for said database over said wide area data network; and
    a graphical user interface server providing graphical user interfaces to allow user access to said shared data, said graphical user interfaces being generated at the time of said user access, each comprising a set of methods specific to said shared data and associated with user-selectable icons provided to allow users to interact with said database server via web browsers, said database server being located on a different computer system than said web browsers, said methods generating said read and write requests to access said shared data in response to user selection of said icons during said user access, wherein a user associates an object corresponding to at least one of said graphical user interfaces with at least one of said methods to handle an event.

2. A system as in claim 1, wherein said database is a project tracking data base.

3. A system as in claim 1, wherein said graphical user interface server generates said graphical user interfaces using applets.

4. The method of claim 3, wherein the generated graphical user interfaces allow a user to query the database server for data relating to one or more projects.

5. The method of claim 3, wherein the generated graphical user interfaces comprise text boxes for creating or editing data retrieved from the database server.

6. The method of claim 3, wherein at least one of the generated graphical user interfaces provides a list including names of one or more projects.

7. The method of claim 6, wherein selecting a name from said list displays a graphical user interface comprising plurality of data fields, each field configured to provide information about various aspects of a project.

8. A method for tracking projects over a wide area data network, comprising the steps of:
   providing a project database for including therein data pertinent to said projects;
   providing a database server, having read and write access to said database, for receiving read and write access requests for said database over said wide area data network; and
   providing a graphical user interface server to generate graphical user interfaces at the time a user accesses said data, said graphical user interfaces each comprising a set of methods specific to said data and associated with user-selectable icons, said graphical user interfaces being provided for user interactions with said database server via web browsers, said database server being located on a different computer system than said web browsers, said methods generating said read and write requests to access said data in response to said icons being selected by a user during said user access, wherein a user associates an object corresponding to at least one of said graphical user interfaces with at least one of said methods to handle an event.

9. A method as in claim 8, wherein said project database stores for each project a record indicating a scope of the project, and according to said scope a number of documentation and review requirements to be met.

10. A method as in claim 9, further comprising the step of updating said project database as each documentation and review requirements is met.

11. A method as in claim 10, wherein said step of updating is achieved using a web browser on a client computer interacting with said graphical user interface server across said wide area data network through said graphical user interfaces.

12. A method as in claim 9, wherein in said record for each of said project, each of said documentation and review requirements is provided as a written description.

13. A method as in claim 8, wherein said graphical interfaces are managed by applets.

14. A web-based project management system comprising:
   a graphical user interface (GUI) server in communication with a database server managing project information;
   wherein, in response to a user browsing a web page associated with the GUI server, the GUI server provides one or more graphical user interfaces comprising one or more GUI objects;
   wherein the GUI server in response to user interaction with the one or more GUI objects communicates with the database server to access or edit the project information based on user-supplied methods associated with each said one or more GUI objects; and
   wherein said database server is located on a different computer system than a user computer system and a user associates an object corresponding to at least one of said graphical user interfaces with at least one of said methods to handle an event.

15. The system of claim 14, wherein user-supplied methods are included in one or more programs segments capable of execution on the GUI server for providing the one or more graphical user interfaces, wherein based on the user-supplied methods the one or more program segments translate user interaction with each said one or more GUI objects to one or more requests submitted to the database server.

16. The system of claim 15, wherein the GUI server communicates with the database server through a communication interface that can interpret the submitted requests.

17. The system of claim 16, wherein the GUI server communicates with the database server through a communication socket.

18. The system of claim 17, wherein code capable of execution on the database server establishes an input-output stream with the communication interface so the submitted requests are transmitted to the communication interface via the input-output stream.

19. The system of claim 18, wherein the communication interface interprets the submitted requests so that the requests can be serviced by the database server.

20. The system of claim 19, wherein in response to the submitted requests the database server services the requests and communicates back with the GUI server by way of the communication interface.

21. The system of claim 15, wherein said one or more requests are submitted in the form of a database query language.

22. The system of claim 21, wherein the database language is SQL.

23. The system of claim 15, wherein the one or more program segments are java applets.

24. The system of claim 14, wherein the user-supplied methods are separately written code for action methods for handling events that result from user interaction with the GUI objects.

25. A method of managing data stored in a database, the method comprising:
   instantiating a database server object to promote data communication between a graphical user interface (GUI) server and a database server that manages data stored in a database;
   opening a communication socket between the database server and the GUI server; and
   instantiating a connection object by the database server object for calling a communication interface program that provides for communication of data between the database server and the GUI server;
   associating an object corresponding to at least a graphical user interface provided by the GUI server with a method to handle an event,
   wherein in response to a request submitted by the GUI server via the socket, the connection object constructs an input/output data stream for transmitting the submitted request to the communication interface; and
   wherein said database server is located on a different computer system than a user computer system.

26. The method of claim 25, wherein the communication interface forwards the request to the database server, the method further comprising:
   servicing the submitted request.

27. The method of claim 26, further comprising:
   providing a reply to the connection object when the request is serviced.

28. The method of claim 27, further comprising:
   invoking program code on the GUI server to provide a user interface comprising one or more GUI objects, wherein the GUI server in response to user interaction with the one or more GUI objects communicates with the database server to access or edit the database on user-supplied methods associated with each said one or more GUI objects.

29. The method of claim 28, wherein user-supplied methods are included in one or more program segments capable of execution on the GUI server for providing the one or more graphical user interfaces.

30. The method of claim 29, wherein based on the user-supplied methods the one or more program segments translate user interaction with each said one or more GUI objects to one or more requests submitted to the database server.

31. A method of tracking projects over a network, comprising:
   accessing shared data in a project database stored on a database server;
   generating a plurality of graphical user interfaces to provide read and write access to the database server in response to a user access, the graphical user interfaces being generated from a set of user-selectable options to generate a plurality of read and write requests to access the project database;
   associating an object corresponding to at least one of the graphical user interfaces with an action method to handle an event;
   transmitting the graphical user interfaces over the network to a web browser; and
   processing the read and write requests in a query processor on the database server.

32. The method of claim 31 wherein the set of user-selectable options is provided through a user-defined workspace.

33. The method of claim 32 wherein the user-defined workspace is designed using SpecTcl.

34. The method of claim 31 wherein the graphical user interface server is on a first device and the database server is located on a second device, the first and second devices being located on a local area network.

35. The method of claim 34 wherein the graphical user interface server and database server communicate via sockets over the local area network.

36. The method of claim 31 wherein the network is a wide-area network.

37. The method of claim 31 wherein the network is Internet.

38. The method of claim 31 wherein the graphical user interface server generates the graphical user interfaces using applets.

39. The method of claim 31 wherein the project database stores for each project information selected from a group comprising a record indicating a scope of the project, project documentation information, and a plurality of review requirements.

40. The method of claim 31 wherein the read and write requests are submitted in the form of a database query language.

41. The method of claim 40 wherein the database query language is SQL.

42. The method of claim 31 wherein the database server is one or more instances of a Sybase database system.

43. The method of claim 31 wherein the graphical user interface server includes information selected from a group comprising a software development architecture and a software release architecture.

44. The method of claim 31 wherein the web browser is a Netscape Navigator browser.

* * * * *